(12) United States Patent
Wang

(10) Patent No.: US 8,551,595 B2
(45) Date of Patent: Oct. 8, 2013

(54) MODULARIZED ASSEMBLING AND SHAPING STRUCTURE OF BAMBOO FRAME

(76) Inventor: Wen-Tsan Wang, Taipei (TW)

( * ) Notice: Subject to any disclaimer, the term of this patent is extended or adjusted under 35 U.S.C. 154(b) by 220 days.

(21) Appl. No.: 13/273,243

(22) Filed: Oct. 14, 2011

(65) Prior Publication Data

US 2013/0095283 A1 Apr. 18, 2013

(51) Int. Cl.
*B32B 3/28* (2006.01)
(52) U.S. Cl.
USPC .......................................... 428/66.6; 428/58
(58) Field of Classification Search
USPC ................................................ 428/66.6, 58
See application file for complete search history.

(56) References Cited

U.S. PATENT DOCUMENTS

2010/0078430 A1* 4/2010 Wang .......................... 220/4.28

* cited by examiner

*Primary Examiner* — Alexander Thomas
(74) *Attorney, Agent, or Firm* — Leong C. Lei

(57) ABSTRACT

A modularized assembling and shaping structure of bamboo frame includes providing previously machined and prepared bamboo strips of desired lengths and quantity and applying fixtures to bend the bamboos into a desired geometric shape, such as rectangle, circle, and ellipse. The opposite ends of each frame loop are then applied with adhesives for jointing and bonding to each other to form a closed frame loop so that each frame loop has only one jointing connection. A plurality of frame loops that is of similar shapes but has different cross-sectional dimensions is concentrically nested together, with the mating surfaces of adjacent frame loops bonded together with adhesives and the jointing connections of the frame loops being not in alignment with each other, to form a bamboo frame of improved overall frame strength.

3 Claims, 5 Drawing Sheets

MODULARIZED ASSEMBLING AND SHAPING STRUCTURE OF BAMBOO FRAME

TECHNICAL FIELD OF THE INVENTION

The present invention generally relates to processing of bamboo in a modularized manner in order to manufacture assembled and shaped structures of geometric frame.

DESCRIPTION OF THE PRIOR ART

A number of materials are used to manufacture furniture, such as tables, chairs, and cabinets. Examples of the material include for example stone, glass, wood, plastic, stainless steel, and the likes. Furniture made of wood or bamboo showing unique characteristics of simplicity and classicalism is of particular interest by those believing in elegancy and taste and loving European styles.

Wooden furniture is made of materials from woods and forests and excessive logging must be done to obtain the material. This worsens the global warming of Earth. Reduced logging for the purposes of postponing global warming makes bamboo a promising alternative for replacing wood, for bamboo grows very fast and is easy to culture and is thus of great economic value and almost unlimited future potential. However, it is of difficult to replace wood with bamboo for bamboo is of a tubular shape that has a wall that is generally not sufficiently thick. To provide a material of great thickness, the bamboo, after being cut off, must be axially slit to form elongate bamboo strips of desired widths. These strips are then machined to remove curved portions and this makes the final machined bamboo strips very thin. As a consequence, assembling a number of bamboo strips together is a feasible way for making a bamboo material having a great thickness. Particularly, to make furniture with bamboo must first construct a frame to serve as a basic skeleton of the furniture. The frame is then combined with boards or strips to form for example a cabinet or a storage case. Such a frame can be of various geometric shapes, such as rectangle, circle, and ellipse. Traditionally, the frame is manufactured by providing bamboo strips of predetermined lengths and quantity and bending the bamboo strips to form a plurality of curved sections with fixtures. The circular sections are then jointed together to form a closed frame. For example, four L-shaped curved sections, or two U-shaped curved sections, or two L-shaped curved section and one U-shaped curved section, can be jointed to form a substantially rectangular closed frame.

To make a bamboo frame, a number of curved sections must be jointed together. This is a complicated process and requires a great expense of manufacturing. In addition, the frame so made exhibits a number of joints due to being composed of multiple sections together. This leads to reduced strength of the frame.

SUMMARY OF THE INVENTION

An objective of the present invention is to provide a solution for handling the problem that the conventional way of manufacturing bamboo frames takes a complicated process and high manufacturing costs and the manufactured bamboo frames are of reduced strength due to being composed of multiple sections.

The feature of the present invention is using previously machined and prepared bamboo strips of desired lengths and quantity and applying fixtures to bend the bamboos into a desired geometric shape, such as rectangle, circle, and ellipse. The opposite ends of each frame loop are then applied with adhesives for jointing and bonding to each other to form a closed frame loop. A plurality of frame loops that is of similar shapes but has different cross-sectional dimensions is concentrically nested together, with the mating surfaces of adjacent frame loops bonded together with adhesives, to form a bamboo frame.

The plurality of differently-sized frame loops that is used in the present invention to form a frame is concentrically nested together, so that the outermost one of the frame loops has the greatest cross-sectional dimension, while the innermost one of the frame loops has the smallest cross-sectional dimension, the remaining frame loops being sequentially reduced in size from the outer side toward the inner side. In other words, the frame loops are made of bamboo strips of different lengths. Thus, computation by means of a computer may be needed in determining the lengths and quantity of the bamboo strips for making each of the frame loops. In concentrically nesting the frame loops, an outside surface of the outermost frame loop and an inside surface of the innermost frame loop are not applied with adhesives and the inside and outside surfaces of the remaining frame loops are all applied with adhesives and nested and then, fixtures are used to apply compression forces to the side surfaces of the frame loops in order to have them bond together, whereby the plurality of frame loops is bonded together to form a frame.

The frame loops according to the present invention are made by applying adhesives to joint opposite ends of each bamboo strip, so that each frame loop has only one jointing connection. Preferably, the jointing connections of different frame loops are set at different locations, whereby when all frame loops are concentrically nested, the jointing connections are not in alignment with each other and thus the overall strength of the frame so formed can be increased.

The present invention does not set any limitation to the number of frame loops used and the number of the frame loops used is determined by a desired thickness of the final product of frame.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
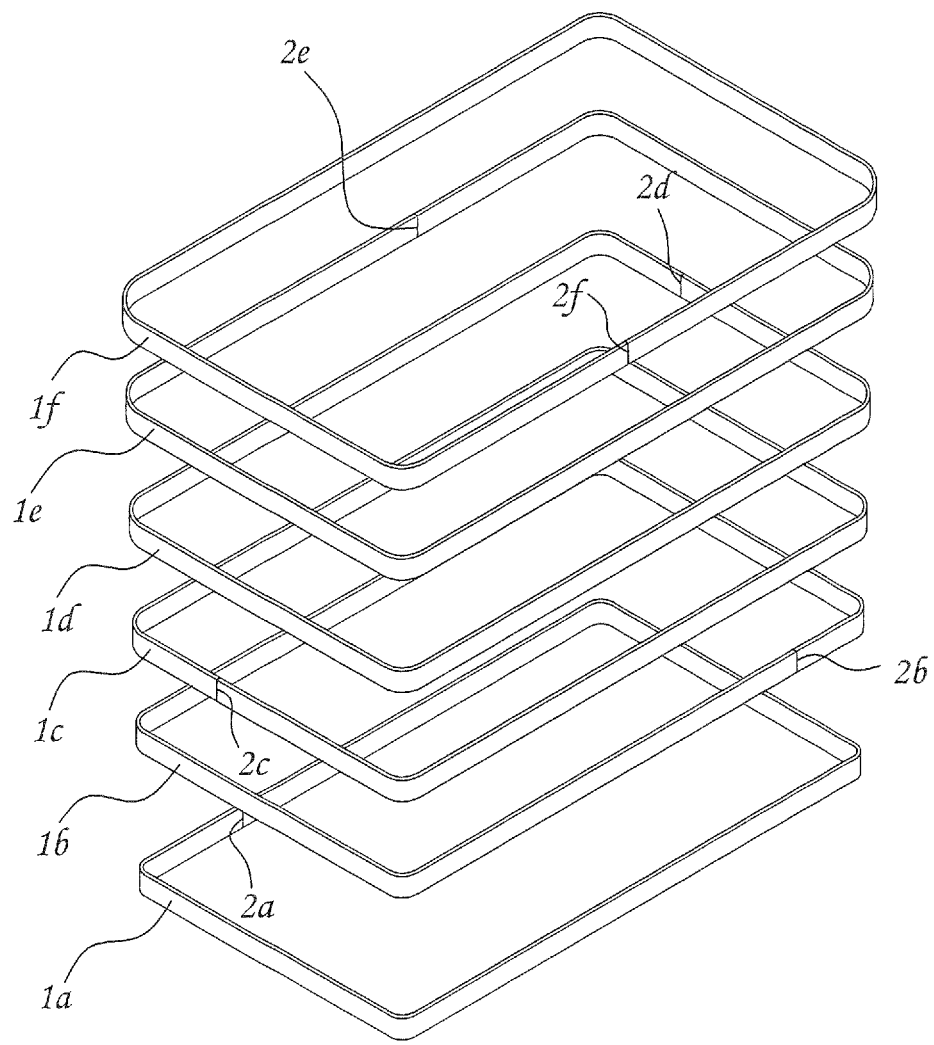
FIG. 1 is an exploded view showing a plurality of frame loops that is of similar rectangular shapes and has different cross-sectional dimensions is formed by bending bamboo strips with fixtures according to the present invention.
Figure 2:
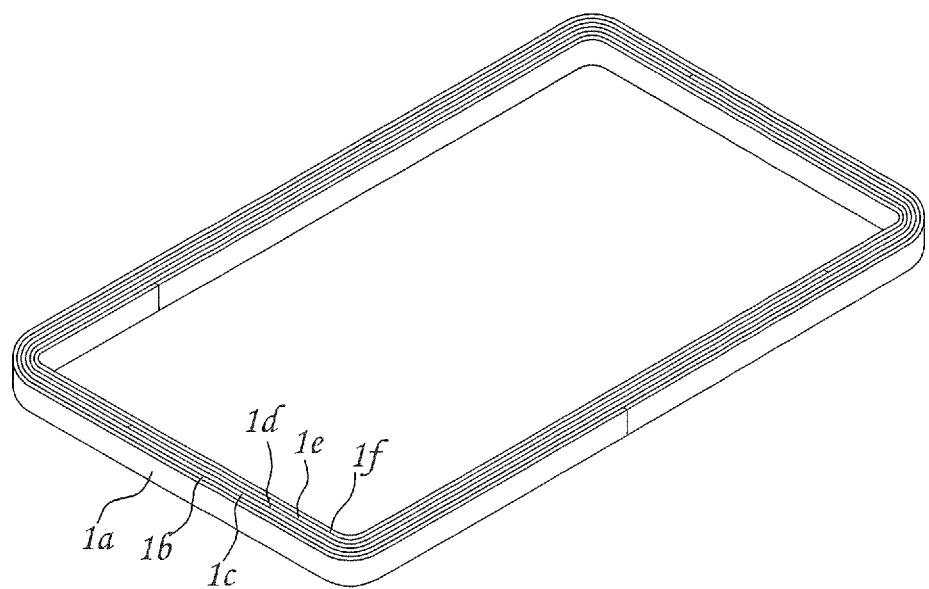
FIG. 2 is a perspective view showing the frame loops of FIG. 1 are nested and bonded together to form a rectangular frame according to the present invention.
Figure 3:
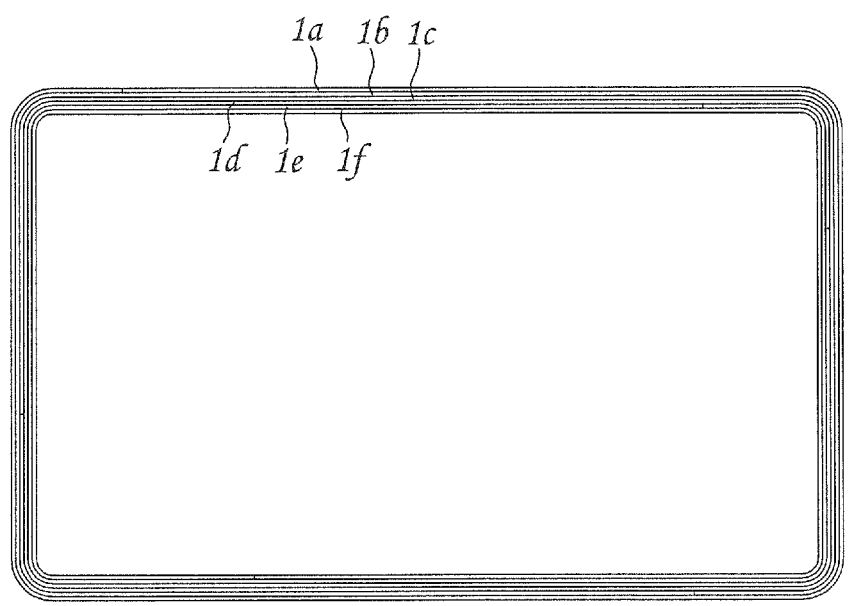
FIG. 3 is a plan view showing the frame loops of FIG. 1 are nested and bonded together to form a rectangular frame according to the present invention.

FIGS. 1-3 show a modularized assembling and shaping structure of bamboo frame according to a first embodiment of the present invention, which comprises a plurality of frame loops $1a$-$1f$, which are of similar rectangular shapes, but have different cross-sectional dimensions or "diameters". The frame loops $1a$-$1f$ are made by bending bamboo strips that are processed and prepared in advance with the aid of fixtures to form a rectangle and applying adhesives to opposite ends, which are then subjected to forcible compression to joint together and show a closed form. In other words, each frame loop $1a$-$1f$ has one jointing connection $2a$-$2f$. The frame loops $1a$-$1f$ are assembled together in such a way that, inside the frame loop $1a$ that has the greatest cross-sectional dimension, the remaining frame loops $1b$-$1f$ are sequentially and concentrically fit and nested in an inward direction to form a frame. Before nesting, an outside surface of the outermost frame loop $1a$ and an inside surface of the innermost frame loop if are not applied with adhesives and the inside and outside surfaces of the remaining frame loops $1b$-$1e$ are all applied with adhesives. Then, fixtures are used to apply compression forces to the side surfaces of the frame loops in order to have them bond together, whereby the plurality of frame loops $1a$-$1f$ is tightly bonded together to form a frame. Preferably, between two adjacent frame loops, the inside cross-sectional dimension of the relatively large frame loop is substantially identical to the outside cross-sectional dimension of the relatively small frame loop so that the nesting and bonding between the two frame loops can be tight and close.

Each frame loop $1a$-$1f$ is formed by adhesively jointing and fixing two opposite ends thereof so that the frame loop shows only one jointing connection $2a$-$2f$. Preferably, each frame loop $1a$-$1f$ is constructed by setting the jointing connection at different location, so that when all the frame loops $1a$-$1f$ are nested, all the jointing connections $2a$-$2f$ are not in alignment with each other, making it difficult to separate at the jointing connections and thus improving the overall strength of the frame.

According to the present invention, no specific limitation is set to the number of frame loops contained in a frame. The number of frame loops used is determined by for example a desired thickness of the final frame.

Figure 4:
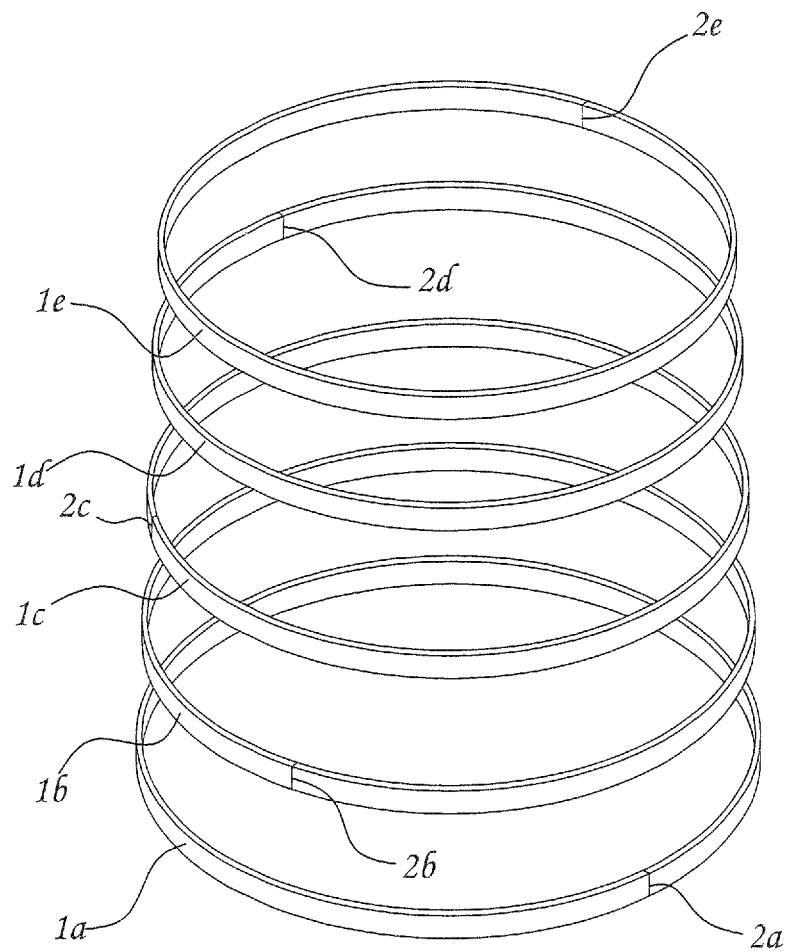
FIG. 4 is an exploded view showing a plurality of frame loops that is of similar circular shapes and has different diameters is formed by bending bamboo strips with fixtures according to the present invention.
Figure 5:
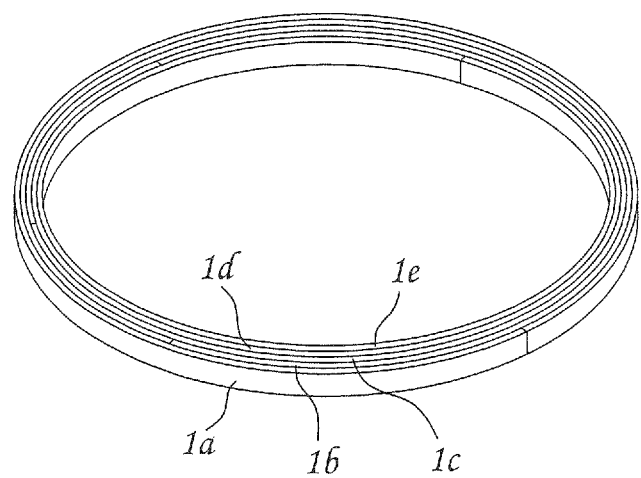
FIG. 5 is perspective view showing the frame loops of FIG. 4 are nested and bonded together to form a circular frame according to the present invention.

FIGS. 4 and 5 show a modularized assembling and shaping structure of bamboo frame according to a second embodiment of the present invention, which, similarly, comprises a plurality of frame loops $1a$-$1e$, which are of similar circular shapes but have different diameters. The frame loops $1a$-$1e$ are made by bending bamboo strips that are processed and prepared in advance with the aid of fixtures to form a circle and applying adhesives to opposite ends, which are then subjected to forcible compression to joint together and show a closed circular form. In other words, each frame loop $1a$-$1e$ has one jointing connection $2a$-$2e$. The frame loops $1a$-$1e$ are assembled together in such a way that, inside the frame loop $1a$ that has the greatest diameter, the remaining frame loops $1b$-$1e$ are sequentially and concentrically fit and nested in an inward direction to form a frame. Before nesting, an outside surface of the outermost frame loop $1a$ and an inside surface of the innermost frame loop $1e$ are not applied with adhesives and the inside and outside surfaces of the remaining frame loops $1b$-$1d$ are all applied with adhesives. Then, fixtures are used to apply compression forces to the side surfaces of the frame loops in order to have them bond together, whereby the plurality of frame loops $1a$-$1e$ is tightly bonded together to form a frame. Preferably, between two adjacent frame loops, the inside diameter of the relatively large frame loop is substantially identical to the outside diameter of the relatively small frame loop so that the nesting and bonding between the two frame loops can be tight and close It will be understood that each of the elements described above, or two or more together may also and a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A modularized assembling and shaping structure of bamboo frame comprising a plurality of frame loops that are of similar shapes but have different cross-sectional dimensions, the frame loops being formed by bending bamboo strips with opposite ends of each bamboo strip jointed together to form a closed form, so that each frame loop has a single jointing connection, the jointing connections of the frame loops being set at different locations, the frame loops being concentrically nested together with the jointing connections thereof being not in alignment with each other so as to form a bamboo frame.

2. The modularized assembling and shaping structure of bamboo frame according to claim 1, wherein inside diameter of a relatively large frame loop of two adjacent frame loops is substantially identical to outside diameter of a relatively small frame loop of the two adjacent frame loops.

3. The modularized assembling and shaping structure of bamboo frame according to claim 1, wherein before nesting, an outside surface of an outermost frame loop and an inside surface of an innermost frame loop are not applied with adhesives and the inside and outside surfaces of the remaining frame loops are all applied with adhesives and nested and then, fixtures are used to apply compression forces to the side surfaces of the frame loops in order to have them bond together, whereby the plurality of frame loops is tightly bonded together to form a frame.

* * * * *